(12) United States Patent
Okello

(10) Patent No.: US 7,760,758 B2
(45) Date of Patent: Jul. 20, 2010

(54) METHOD AND APPARATUS FOR BLINDLY SEPARATING MIXED SIGNALS, AND A TRANSMISSION METHOD AND APPARATUS OF MIXED SIGNALS

(75) Inventor: James Awuor Okello, Tokyo (JP)

(73) Assignee: NEC Corporation, Tokyo (JP)

( * ) Notice: Subject to any disclaimer, the term of this patent is extended or adjusted under 35 U.S.C. 154(b) by 371 days.

(21) Appl. No.: 11/792,239

(22) PCT Filed: Dec. 5, 2005

(86) PCT No.: PCT/JP2005/022292

§ 371 (c)(1),
(2), (4) Date: Jun. 4, 2007

(87) PCT Pub. No.: WO2006/059767

PCT Pub. Date: Jun. 8, 2006

(65) Prior Publication Data

US 2007/0258353 A1  Nov. 8, 2007

(30) Foreign Application Priority Data

Dec. 3, 2004  (JP)  ............................. 2004-351352

(51) Int. Cl.
H04J 3/06  (2006.01)
H04J 9/00  (2006.01)
(52) U.S. Cl. ...................................... 370/465; 370/468
(58) Field of Classification Search ................. 370/465, 370/328, 208, 464, 468, 481; 375/316
See application file for complete search history.

(56) References Cited

U.S. PATENT DOCUMENTS 6,236,862 B1 * 5/2001 Erten et al. ................. 455/501

| | | | | |
|---|---|---|---|---|
| 6,424,960 B1 * | 7/2002 | Lee et al. | ....................... | 706/20 |
| 6,529,606 B1 * | 3/2003 | Jackson et al. | ............. | 381/71.4 |
| 6,691,073 B1 * | 2/2004 | Erten et al. | .................. | 702/190 |
| 6,799,170 B2 * | 9/2004 | Lee et al. | ....................... | 706/20 |
| 7,085,711 B2 * | 8/2006 | Kadambe | .................... | 704/201 |
| 2002/0027985 A1 | 3/2002 | Rashid-Farrokhi | | |
| 2003/0123381 A1 * | 7/2003 | Zhuang et al. | .............. | 370/208 |
| 2004/0131025 A1 * | 7/2004 | Dohler et al. | ................ | 370/328 |
| 2005/0084000 A1 * | 4/2005 | Krauss et al. | ................ | 375/148 |
| 2005/0105644 A1 * | 5/2005 | Baxter et al. | ................. | 375/316 |
| 2006/0262939 A1 * | 11/2006 | Buchner et al. | ............... | 381/56 |

FOREIGN PATENT DOCUMENTS

| | | |
|---|---|---|
| JP | 2001-177506 | 6/2001 |
| JP | 2002-84260 A | 3/2002 |
| JP | 2003-304176 | 10/2003 |
| JP | 2004-166038 | 6/2004 |

* cited by examiner

Primary Examiner—Chi H Pham
Assistant Examiner—Robert Lopata
(74) Attorney, Agent, or Firm—Young & Thompson

(57) ABSTRACT

A method of blindly separating a signal, wherein, for at least one source, a filter uniquely defined for a source is determined for each source, the method comprising the steps of: applying an inverse filter corresponding to inverse of the filter to one or more of multiple outputs of the received signal so as to restore property of the corresponding source; and adjusting gain of each of outputs which have been filtered by the inverse filter, under constraint that a sum of weighted multiplexed filtering output signals has the same property as an original signal of the corresponding source, in order to remove other sources or interfering signals which occupy the same frequency band or transmission time interval.

21 Claims, 7 Drawing Sheets

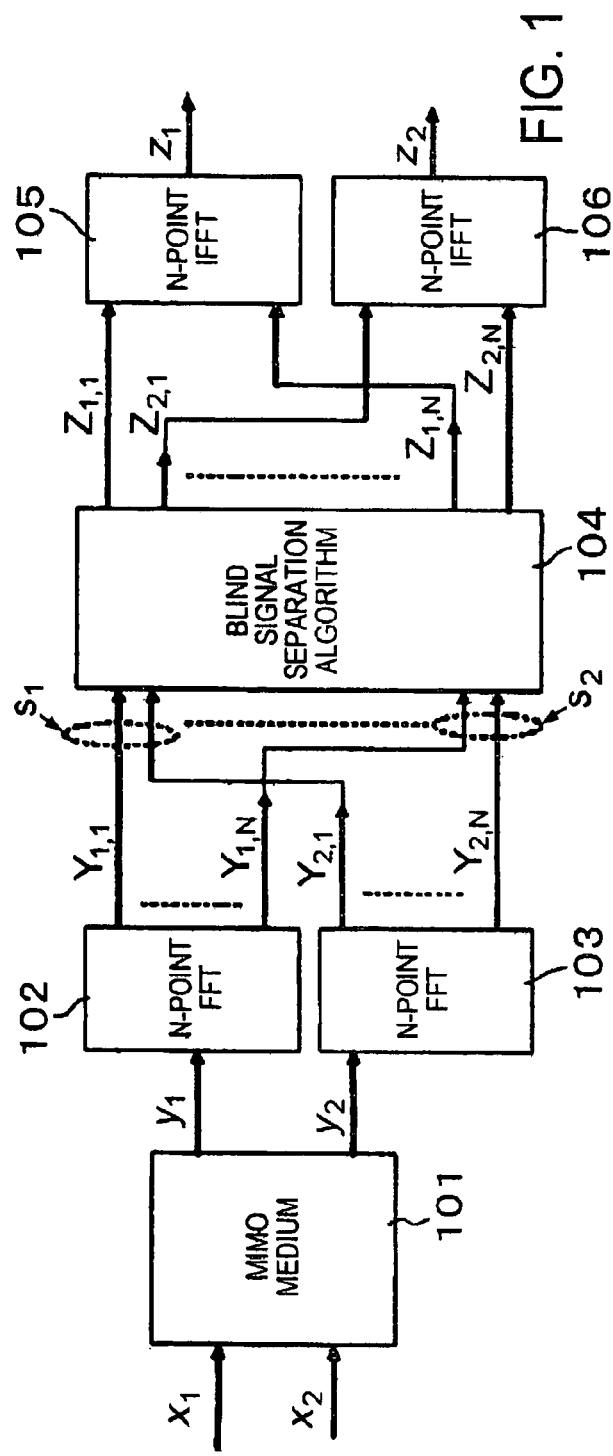
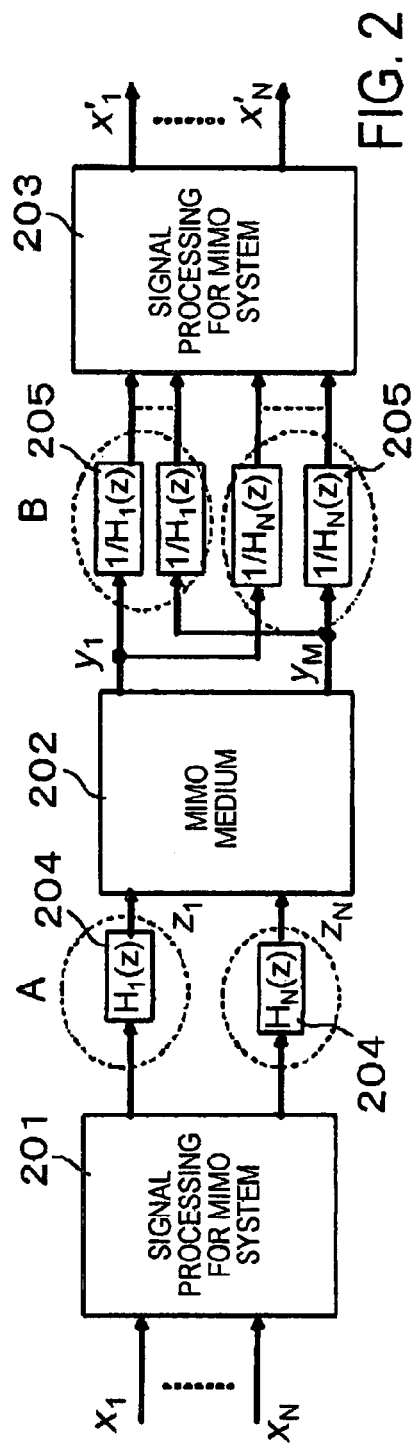
FIG. 1
FIG. 2

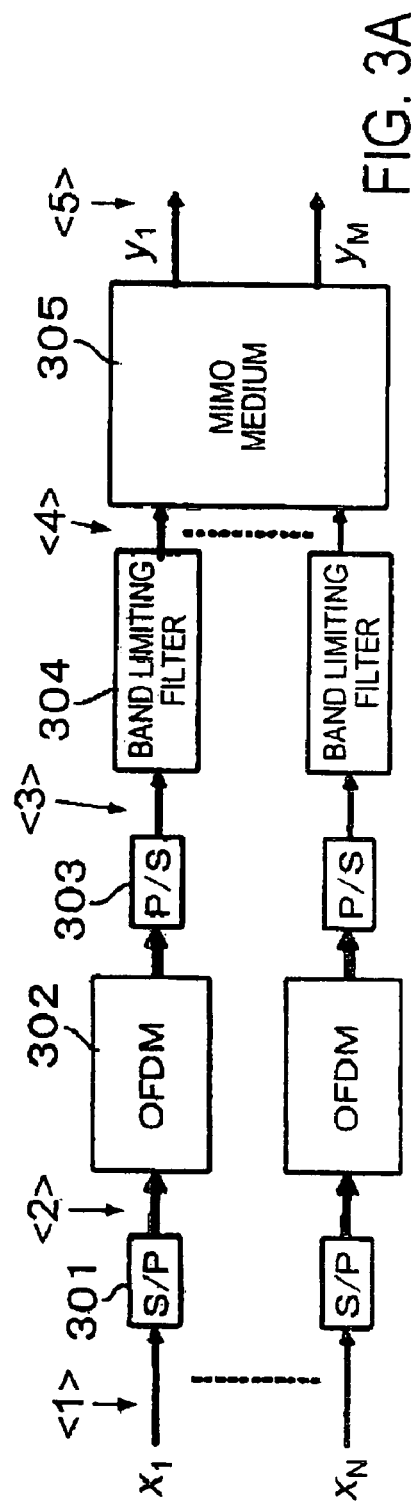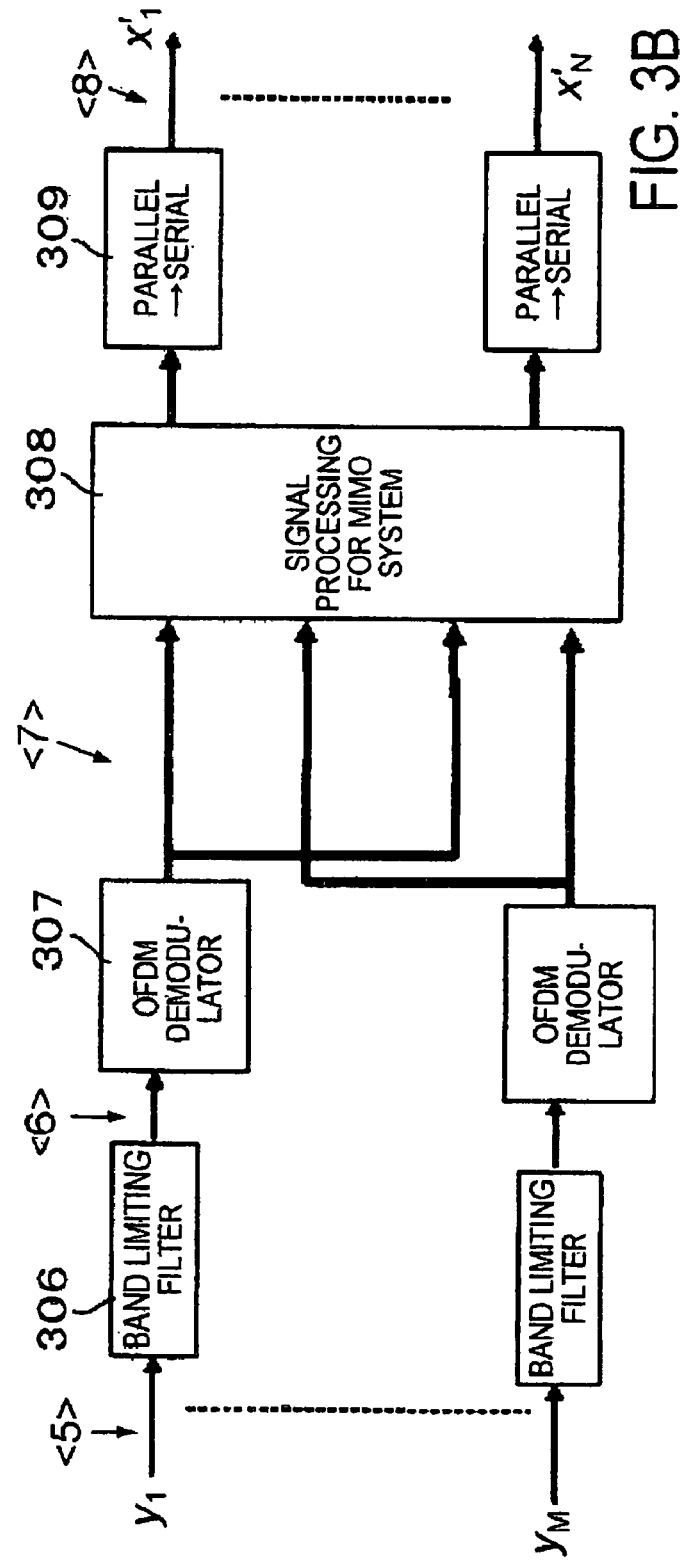

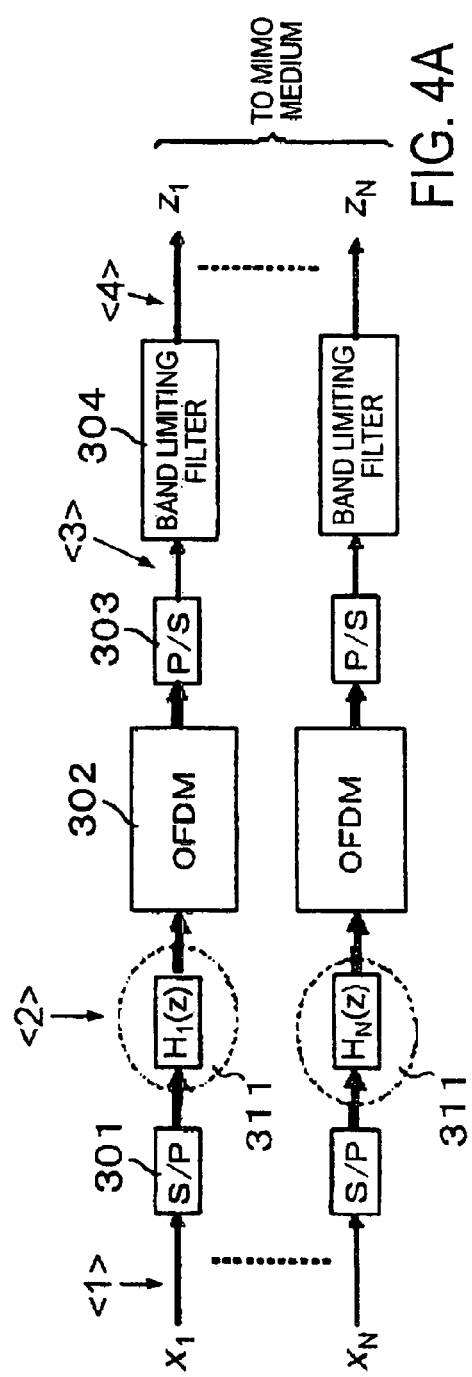
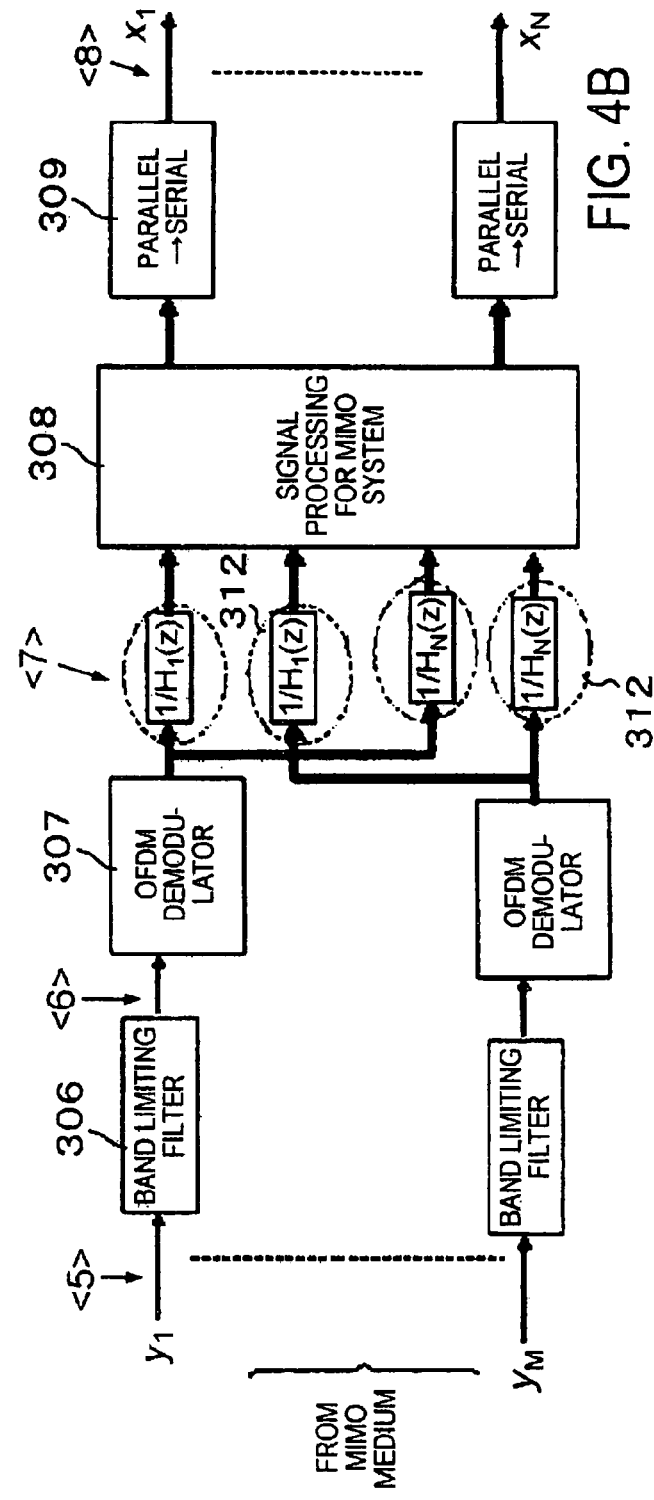
FIG. 4A
FIG. 4B

METHOD AND APPARATUS FOR BLINDLY SEPARATING MIXED SIGNALS, AND A TRANSMISSION METHOD AND APPARATUS OF MIXED SIGNALS

TECHNICAL FIELD

The present invention is related to a communication system provided with a multiple input and multiple output channel, for transmitting multiple signals between two points, and more particularly to a method and apparatus for blindly separating the mixed signals, and to a transmission method and apparatus of the mixed signals which are suitable for performing such blind separation.

BACKGROUND ART

A system with multiple transmitters and multiple receivers (Multiple Input Multiple Output: MIMO) has been applied to communication systems so as to achieve diversity and/or high rates of data transmission. In such a MIMO system, multiple source signals are multiplexed into one mixed signal and transmitted, and the signal retrieved from a medium consists of a mixture of the signals of interest. A MIMO system is used not only for communication systems but also for recording signals and information to high density recording media.

On a receiving side or a reading side of signal from a recording medium, it is necessary to separate the respective source signals from the mixed signal and retrieve the source signals in the same order as they were transmitted to the medium or recorded on the medium. Conventionally, in such a system, training data is used to estimate channel state information (CSI) or inverse channel state information (ICSI). On the receiver side, an approximate CSI or inverse channel state information (ICSI) is then used to separate the mixed signals or initialize the coefficients of a blind adaptive algorithm, which adaptively adjusts its coefficients, ensuring that the output always consists of de-mixed signals. However, as described later, use of the training signal causes reduction of the throughput of the communication system or reduction of the storage capacity of a high density recording medium.

An approach which is directly related to this patent is a complete blind identification of MIMO CSI or MIMO ICSI [1]-[5]. In these methods, only the received signal is used, and no priori knowledge of the transmitted signals is assumed. Based on this assumption, there are several approaches that have been used to estimate the CSI or ICSI of a MIMO channel. Basically, these estimation methods can be classified as based on: the original signal properties such as orthogonality, constant modulus, and cyclo-stationarity; assumption that the sources are independent; and sub-space based techniques [1]-[12]. In all these methods, separation of the mixed signals is possible. However, since a complete blind identification of CSI has multiple solutions, each of which are permutations of another, it is not possible to assign a separated source signal to a specific source on the transmitter side [8]-[12]. When a solution is given as a sequence, permutation is a sequence in which the order of elements of such a solution are permutated. When the statistics of the source signals are used as a cost function, it is also possible that the blind algorithm will result in a solution where the in-phase or quadrature component of a given source is permutated with an in-phase or quadrature component of another source.

In blind source separation (BSS) of convolutive mixed sources, frequency domain has been utilized to minimize computational complexity that is associated with time domain BSS [13]-[15]. In one example, the signals received by each of the receiving sensors are firstly converted to the frequency domain using FFT (fast Fourier transform). Once this has been done, the convolutive mixture problem is converted to an instantaneous mixture problem of the respective bins of the sources [13], [15]. Furthermore, by utilizing the method explained in [16], it is possible to make permutation that occurs in each frequency bin uniform to all the frequency bins. As an example, FIG. 1 shows a system for BSS where the received signal is processed in the frequency domain.

The system shown in FIG. 1 is provided with: MIMO medium 101 which takes signals $x_1$, $x_2$ as input and signals $y_1$, $y_2$ as output; FFT operation unit 102 performing N-point FFT on signal $y_1$; FFT operation unit 103 performing N-point FFT on signal $y_2$; blind separation operation unit 104 applying the blind signal separation algorithm to the outputs of these FFT operation units 102, 103; and IFFT operation units 105, 106 performing N-point IFFT (inverse fast Fourier transform) on the output of blind separation operation unit 104 to output signals $z_1$, $z_2$, respectively. In this system:

(a) $x_1$ and $x_2$ are the original source signals, with a Fourier transform $\{X_{1,1} \ldots X_{1,NF}\}$ and $\{X_{2,1} \ldots X_{2,NF}\}$, respectively;

(b) $y_1$ and $y_2$ are the received signals after passing through MIMO transmission medium 101. $\{Y_{1,1} \ldots Y_{1,N}\}$, which are supplied from FFT operation unit 102, are the frequency bins of the Fourier transform of the received signal $y_1$. Similarly, $\{Y_{2,1} \ldots Y_{2,N}\}$, which are supplied from FFT operation unit 103, corresponds to N pieces of the frequency bins of the Fourier transform of received signal $y_2$; and (c) After pairing the frequency bins of the received signals into pairs $s_1$ to $s_N$, a blind separation algorithm is used by blind separation operation unit 104 to separate the bins corresponding to the original signals $x_1$ and $x_2$, respectively. Then, signals $z_1$, $z_2$ are obtained by applying inverse Fourier transform by IFFT operation units 105, 106. In case there is no permutation of bins as specified in reference [16], the frequency bins $Z_{1,1}$ to $Z_{1,N}$ will correspond to only one of $x_1$ and $x_2$, and signal $z_1$ will thus corresponds to only one of $x_1$ and $x_2$. On the other hand, if there is a permutation, the first bin $Z_{1,1}$ may correspond to $X_{1,1}$, while the next bin $Z_{1,2}$ may correspond to $X_{2,2}$. Thus, though it is possible to separate the sources without their frequency components being permutated, the problem of permutation of the sources still remains.

The references cited in this description will be listed below:

[1] Chong-Yung Chi; Chii-Horng Chen, "Cumulant-based inverse filter criteria for MIMO blind deconvolution: properties, algorithms, and application to DS/CDMA systems in multipath," IEEE Transactions on Signal Processing, Volume: 49, Issue: 7, Pages: 1282-1299, July 2001

[2] Chor Tin Ma; Zhi Ding; Sze Fong Yau, "A two-stage algorithm for MIMO blind deconvolution of nonstationary colored signals," IEEE Transactions on Signal Processing, Volume: 48, Issue: 4, Pages: 1187-1192, April 2000

[3] Ka Lok Yeung; Sze Fong Yau, "A super-exponential algorithm for blind deconvolution of MIMO system," Circuits and Systems, 1997. ISCAS '97, Volume: 4, Pages: 2517-2520, 9-12 Jun. 1997

[4] Comon, P.; Moreau, E., "Blind MIMO equalization and joint-diagonalization criteria," Acoustics, Speech, and Signal Processing, 2001. Proceedings. (ICASSP '01), Volume: 5, Pages: 2749-2752, 7-11 May 2001

[5] Kung, S. Y.; Xinying Zhang, "An associative memory approach to blind signal recovery for SIMO/MIMO systems," Neural Networks for Signal Processing XI, 2001. Proceedings of the 2001 IEEE Signal Processing Society Workshop, Pages: 343-362, 10-12 Sep. 2001

[6] T. L. Marzetta, "BLAST Training: Estimating Channel Characteristics for High Capacity Space-Time Wireless,"

Proc. 37th Annual Allerton Conference on Communication, Control, and Computing, pp. 958-966, September 1999

[7] Li Yuanjie and L. Yang, "Semi-blind mimo channel identification based on error adjustment," 2003. Proceedings of the 2003 International Conference on Neural Networks and Signal Processing, Vol. 2, pp. 1429-1432, Dec. 14-17, 2003

[8] Y. Li, K. J. R. Liu, "Adaptive Blind Source Separation for Multiple-Input/Multiple-Output Systems," IEEE Trans., Inform., Theory, vol. 44, No. 7, pp. 2864-2876, November 1998

[9] B. G. Agee, "Blind separation and capture of communication signals using a multitarget constant modulus beamformer," MILCOM '89. Conference Record. vol. 2, pp. 340-346, October 1989

[10] P. Sansrimahachai, D. B. Ward, A. G. Constantinides, "Multiple-input multiple-output least-squares constant modulus algorithms," GLOBECOM '03. IEEE, vol. 4, pp. 2084-2088, December 2003

[11] J. J. Shynk, R. P. Gooch, "Performance analysis of the multistage CMA adaptive beamformer," MILCOM '94. vol. 2, pp. 316-320, 2-5 Oct. 1994

[12] M. Hajian, J. Fernandes, P. Cunha, L. P. Ligthart, "Adaptive equalization for mobile communication systems based on constant modulus algorithm," Vehicular Technology Conference, 2001. IEEE VTS 53rd, vol. 3, pp. 1609-1613, May 2001

[13] Belouchrani, A.; Amin, M G, "Blind source separation based on time-frequency signal representations," Signal Processing, IEEE Transactions on, Volume: 46, Issue: 11, Pages: 2888-2897, November 1998

[14] M. Z. Ikram and D. R. Morgan, "A beamforming approach to permutation alignment for multichannel frequency-domain blind speech separation," Proc. ICASSP, pp. 881-884, May 2002

[15] T. W. Lee, A. J. Bell, and R. Orgimeister, "Blind source separation of real world signals," Proc. ICNN, pp. 2129-2135, June 1997

[16] H. Sawada, R. Mukai, S. Araki and S. Makino, "A Robust and Precise Method for Solving the Permutation Problem of Frequency-Domain Blind Source Separation," IEEE Trans., Speech Audio Processing, vol. 12, no. 5, Sep. 2004

[17] D. Godard, "Self-Recovering Equalization and Carrier Tracking in Two-Dimensional Data Communication Systems," IEEE Transactions on Communications, vol. 28, issue: 11, pp. 1-867-1875, November 1980

[18] K. Oh and Y. Chin, "Modified constant modulus algorithm: Blind equalization and carrier phase recovery algorithm," Proc. IEEE ICC, vol. 1, pp. 498-502, June 1995

[19] Van der Veen, A.-J., "Statistical performance analysis of the algebraic constant modulus algorithm," Signal Processing, IEEE Transactions on, Volume: 50, Issue: 12, Pages: 3083-3097, December 2002

[20] Regalia, P. A., "A finite-interval constant modulus algorithm," Acoustics, Speech, and Signal Processing, 2002. Proceedings. (ICASSP '02). IEEE International Conference on, Volume: 3, Pages: III-2285-III-2288, 13-17 May 2002

DISCLOSURE OF THE INVENTION

Problem to be Solved by the Invention:

In a MIMO system which uses blind identification of CSI, there exist many solutions, each of which is a permutation of another solution. Even though it is possible to blindly separate the mixed signals, it is not possible to assign a given separated source signal to a specific source at the transmitter, without using extra information such as position of the sources and direction relative to the receiver. In a mobile communication system, such information on position and direction of a source is also not available, or may change from time to time even when the information is available. Therefore, in order to achieve a complete BSS of signals in communication systems without any permutation, that is, replacement of the order, it is necessary to solve the problem of multiple solutions that results in permuted signals.

Further, in a mobile communication system, the bandwidth allocated for uplink can be reduced and shared among the users. In this case, the reduction in the bandwidth of uplink can then be utilized for increasing the bandwidth of downlink. With this kind of implementation, a number of mobile users will now have to share the uplink channel. This can be achieved without sacrificing on the throughput of the system, by incorporating multiple reception antennas at the base station leading to a MIMO system. In such a system, MIMO CSI or ICSI must be estimated so as to separate the signals of the users that share the same uplink channel. Use of a training signal may not be recommended in this case due to the need of synchronizing all the mobile terminals irrespective of their position. On the other hand, usage of a conventional blind source separation (BSS) technique will lead to permutation of the signals transmitted by the mobile terminals, which then leads to the necessity of sorting data. Transmission of redundant bits to aid in the sorting will reduce the system's throughput, hence it is not recommended.

In wireless transmission of signals between two points, high transmission rates can be achieved by using multiple transmitters and multiple receivers, leading to a MIMO system that transmits signals in parallel. Alternatively, in single input single output (SISO) systems, orthogonal frequency division multiplexing (OFDM) can be used to transmit data/signals in parallel. In both cases, the received signal may end being mixed up.

Therefore, the object of the present invention is to providing a blind separation method and apparatus which can adequately separate the mixed signal without permutation, that is, replacement of the order, in the resulting outputs.

Another object of the present invention is to provide a transmission method and apparatus of signal which is suitable for such blind separation.

Means for Solving the Problem:

According to a first aspect of the present invention, provided is a method of transmitting data using the same channel and using the same frequency band, time slot or spreading code, without sub-diving spectrum or time such that signals from multiple sources are transmitted in such a way that each source ends up being transmitted in a different frequency band or time slot, the method comprising the steps of: filtering and tagging a signal from a source of at least one source with a filter having property uniquely defined for each of at least one source; and transmitting the tagged data using multiple transmitters or overlapping frequency bands.

According to a second aspect of the present invention, provided is a method of blindly separating a signal of each source from a received signal represented as a multiple output system, wherein, for at least one source, a filter uniquely defined for a source is determined for each source, the method comprising the steps of: applying an inverse filter corresponding to inverse of the filter to one or more of multiple outputs of the received signal so as to restore property of the corresponding source; and adjusting gain of each of outputs which have been filtered by the inverse filter, under constraint that a sum of weighted multiplexed filtering output signals has the same property as an original signal of the corresponding source, in order to remove other sources or interfering signals which occupy the same frequency band or transmission time interval.

According to a third aspect of the present invention, provided is a transmission device for transmitting data using the same channel and using the same frequency band, time slot or spreading code, without sub-diving spectrum or time such that signals from multiple sources are transmitted in such a way that each source ends up being transmitted in a different frequency band or time slot, the transmission device comprising: a filter for filtering and tagging a signal from a source of at least one source, the filter having a property uniquely defined for each of at least one source; and means for transmitting the tagged data using multiple transmitters or overlapping frequency bands.

According to a fourth aspect of the present invention, provided is a system for blindly separating a signal of each source from a received signal represented as a multiple output system, wherein, for at least one source, a filter uniquely defined for a source is determined for each source, the system comprising: an inverse filter corresponding to inverse of the filter, the inverse filter being applied to one or more of multiple outputs of the received signal, the inverse filter restoring property of the corresponding source; and adjustment means for adjusting gain of each of outputs which have been filtered by the inverse filter, under constraint that a sum of weighted multiplexed filtering output signals has the same property as an original signal of the corresponding source, in order to remove other sources or interfering signals which occupy the same frequency band or transmission time interval.

In the present invention, "transmission" is not limited to a term indicating transmission of a signal from a first location to a second location using a medium in which the signal propagates electrically, acoustically or optically. The scope of "transmission" includes recording of signal into a recording medium such as a magnetic recording medium and an optical recording medium. Therefore, "reception" includes reading signal from such a recording medium.

According to the present invention, it is possible to separate the mixed signal without permutation in the resulting outputs.

BRIEF DESCRIPTION OF THE DRAWING

FIG. 1 is a block diagram illustrating the frequency domain blind source separation;

FIG. 2 is a block diagram illustrating the fundamental constitution of a MIMO system according to the present invention in which data is tagged by using a unique filter before transmission;

FIG. 3A is a block diagram illustrating a baseband model of a transmitter unit used in a conventional OFDM system consisting of the transmitter unit and a receiver unit;

FIG. 3B is a block diagram illustrating a baseband model of the receiver unit used in the conventional OFDM system consisting of the transmitter unit and the receiver unit;

FIG. 4A is a block diagram illustrating a baseband model of a transmitter unit used in an OFDM system according to the present invention;

FIG. 4B is a block diagram illustrating a baseband model of a receiver unit used in the OFDM system according to the present invention;

Figure 5:
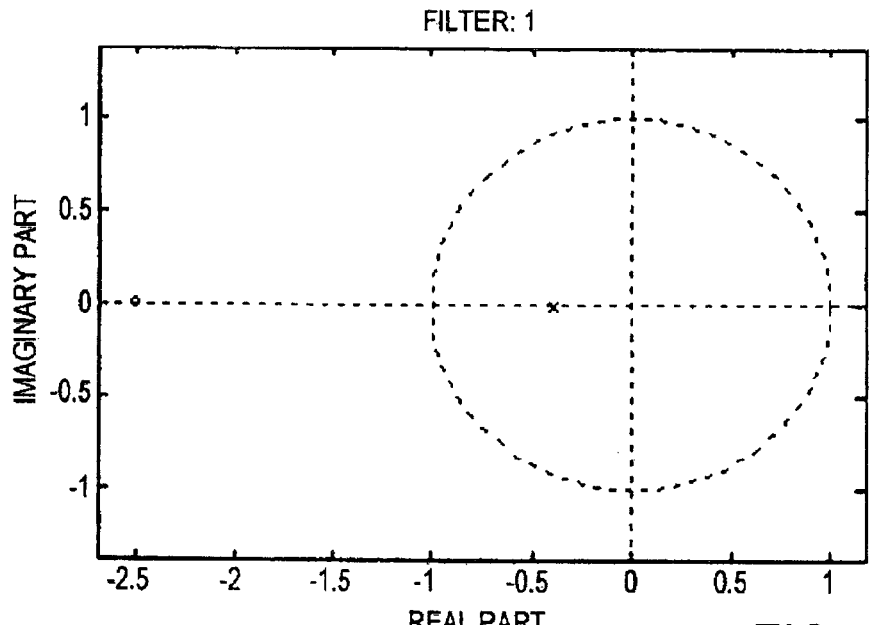
FIG. 5 is a graph illustrating the location of poles and zeros in a system with a single transmission antenna or channel.

EXPLANATION OF REFERENCE NUMERALS 101, 202, 305 MIMO medium;
102, 103 FFT operation units;
104 Blind separation operation unit;
105, 106 IFFT operation units;
201, 203, 308 Signal processing units;
204, 311, 402, 503 Tagging filters;
295, 312 Inverse tagging filters;
301, 401, 501, 502 Serial-to-parallel converters;
302, 403, 504 OFDM modulators;
303, 309, 404, 505 Parallel-to-serial converters;
304, 306, 405, 506 Band limiting filters;
307 OFDM demodulator;

BEST MODE FOR CARRYING OUT THE INVENTION

Next, preferable embodiments of the present invention will be described with reference to the drawings.

FIG. 2 is a block diagram illustrating the basic model of the MIMO system proposed by the present invention. This MIMO system is provided with: signal processing unit 201 receiving signals $x_1, \ldots, x_N$ as inputs and performing signal processing for the MIMO system; MIMO medium 202 arranged at the output side of signal processing unit 201; and signal processing unit 203, which processes the signals delivered from MIMO medium 202 and generate signals $x'_1, \ldots, x'_N$. Tagging filters 204 are placed in position "A" between signal processing unit 201 and MIMO medium 202 while inverse tagging filters 205 are placed in position "B" between MIMO medium 202 and signal processing unit 203.

In this system, the transmitter side and the receiver side are connected by MIMO medium 202, and MIMO medium 202 includes a link which connects the transmitter side and the receiver side and is based on a radio wave, sound wave or light. Further in this system, data is transmitted using the same channel, and using the same frequency band, time slot or spreading code, without sub-diving spectrum or time such that signals from multiple sources are transmitted in a way that each source ends up being transmitted in a different frequency band or time slot For explanation purposes, it is assumed here that the signal is temporally stored in a buffer (signal processing unit 201) of length N. The contents of the buffer are then read out in parallel, and filtered using unique filter (tagging filter 204) uniquely assigned to each output ($x_1$ or $x_2 \ldots x_N$) of the buffer. It should be noted here that the filter under consideration is not a band limiting filter, which is meant to limit the bandwidth of an interpolated signal. Output signals $z_1, \ldots, z_n$ obtained by the filtering in the unique filter are supplied to MIMO medium 202, and signals $y_1, \ldots, y_M$ are obtained from MIMO medium. These signals $y_1, \ldots, y_M$ are filtered by inverse tagging filter 205, and then supplied to signal processing unit 203 which generates signals $x'_1, \ldots, x'_N$.

In the present embodiment, considered is a case where the original signals $x_1, \ldots, x_N$ are constant modulus. This assumption is however not a necessary condition in order to solve the above mentioned permutation problem of the output signals $z_1, \ldots, z_N$.

In order to understand the method according to the present invention, FIGS. 3A and 3B illustrate the conventional orthogonal frequency division modulation (OFDM) system with multiple transmission and reception antennas. FIG. 3A illustrates the constitution on the transmitter side while FIG. 3B illustrates the constitution on the receiver side. On the transmitter side, arranged are: serial-to-parallel (S/P) converters 301 respectively converting original signals $x_1, \ldots, x_n$ from serial data to parallel data; OFDM modulators 302 performing orthogonal frequency division modulation based on the parallel data; parallel-to-serial (P/S) converters 303 converting again the modulated signals to the serial data; and band limiting filters 304 limiting band of the outputs of parallel-to-serial converters 304. The outputs of band limiting filters 304 are supplied to MIMO medium 305. Output signals $y_1, \ldots, y_M$ are obtained from MIMO medium 305. On the receiver side, arranged are: band limiting filters 306 limiting band of signals $y_1, \ldots, y_M$ from MIMO medium 305; OFDM demodulators 307 demodulating the reception filters after the band limiting; signal processing unit 308 processing signals from respective OFDM demodulators 307; and parallel-to-serial converters 309 converting parallel signals from signal processing unit 308 into serial signals. Signals $x'_1, \ldots, x'_N$ are obtained from parallel-to-serial converters 309. OFDM demodulator 307 generates the parallel data by demodulating the input signal which is supplied as the serial data.

On the transmitter side of this conventional OFDM system:

(1) Original signals $\{x_1 \ldots x_N\}$ are firstly converted from serial data to parallel data by serial-to-parallel converters 301;

(2) The parallel data is then modulated using OFDM modulator 302 and the resulting outputs are converted from parallel to serial by parallel-to-serial converters 303;

(3) Next, the serial data is band limited using band limiting filters 304; and (4) The band limited signals are finally transmitted through a multiple input channel of MIMO medium.

At the receiver:

(5) The received signals are band limited by band filters 306;

(6) The band limited signals are passed to OFDM demodulator 307, which generates parallel data that corresponds to the frequency bins of (6);

(7) The mixed signals are then separated using blind adaptive algorithm such as multi-target CMA, among other methods, in signal processing unit 308; and (8) The separated signals are then finally converted from the parallel data format to the serial format $\{x'_1 \ldots x'_N\}$ by parallel-to-serial converters 309.

The conventional OFDM system has been explained hereinabove. In the system according to the present invention, unlike the conventional OFDM system shown in FIG. 3, each constant modulus source signal (that is, orignal signals $\{x_1 \ldots x_N\}$) is filtered by a unique filter before transmission. This unique filter is referred to as a tag (Transmit Tagging Filter: TT-Filter), since each filter is unique to a given source. In other words, filters having different filter property are used for respective sources. In the system according the present embodiments at the receiver side, an inverse filter of the unique filter which is used on the transmission side is used to inversely convert the non-constant modulus signal to a constant modulus signal.

Next, explanations will be given for the location for inserting the tagging filter (unique filter) on the transmission side and the location for inserting the corresponding inverse tagging filter on the reception side. FIGS. 4A and 4B illustrate an OFDM system base on the present invention which includes a transmitter unit and a receiver unit. FIG. 4A illustrates the constitution on the transmitter side while FIG. 4B illustrated the constitution on the receiver side. In these figures, the same reference numerals are used for the same components as those in FIGS. 3A and 3B.

In the present embodiment, tagging filter (unique filter) 311 bas been placed between serial-to-parallel converter 301 and OFDM modulator 302 as indicated by marked position <2> in the figure. However, the position on which tagging filter 311 can be placed is not limited to this. The position for placing tagging filter 311 may marked position <1> in FIG. 4A, or marked position <3>. Since data rates in positions <1> and <2> are different, the tagging filter used in these two positions will also be different in property. When the apparent data rate increases due to parallel-to-serial conversion, the impulse response of the tagging filter will have to be up-sampled by inserting zero. Similarly, although inverse tagging filter has been placed between OFDM demodulator 307 and signal processing unit 308 as indicated by position <7> in FIG. 4B, the placing position is not limited this. Inverse tagging filter 312 may be placed at marked position. <6> in FIG. 4B, or marked position <8>.

In the present embodiment, filters uniquely associated with respective sources differs to each other in the positions of poles and zeros. In other words, when implementing such a unique filter arranged for each source, the poles and zeros of a filter corresponding to a given source should be far from the poles and zeros of the filter used to tag a different source. For explanation purposes, a linear filter such as a first-order all-pass filter is used here as the tagging filter. Such a first-order allpass filter has, for example, a flat frequency response. It should however be noted that higher order filters may be used when there are a large number of transmission antennas, when data rates change because of parallel-to-serial conversion, or when data is multiplied by a scrambling code.

In a general case of a first-order allpass filter associated with transmitter "l", the linear tagging filter will be given Eq. (1):

$$H_l(z) = \frac{r \times \exp\{i \times (2\pi/N) \times (l-1)\} + z^{-1}}{1 + r \times \exp\{i \times (2\pi/N) \times (l-1)\}z^{-1}} \quad (1)$$

Figure 6:
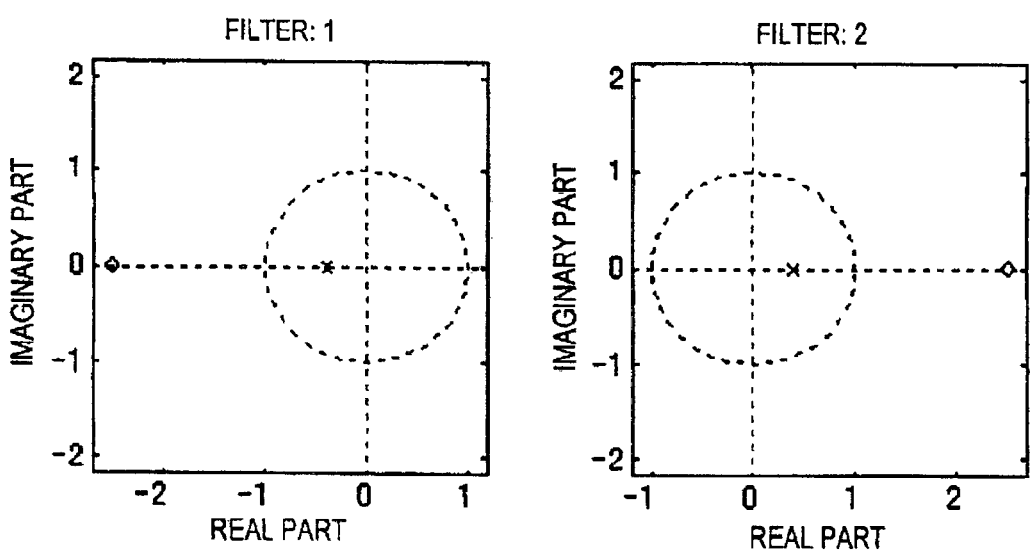
FIG. 6 is a graph illustrating the location of poles and zeros in a system with two transmission antennas or channels.
Figure 7:
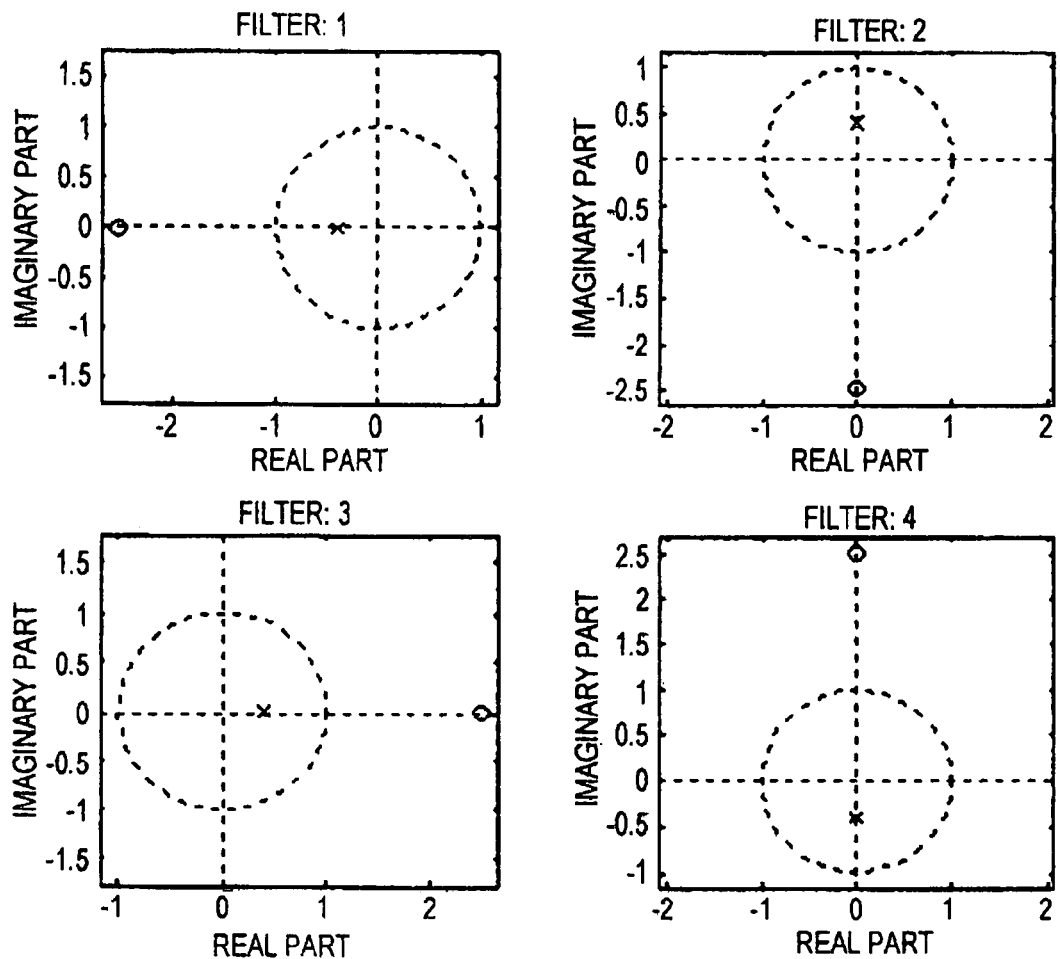
FIG. 7 is a graph illustrating the location of poles and zeros in a system with four transmit antennas or channels.

Examples of diagrams indicating poles and zeros of a filter for different number of transmission antennas are shown in FIGS. 5, 6 and 7. FIG. 5 illustrates the location of poles and zeros in a system with a single transmission antenna or channel. In this case, one filter (Filter 1) is used. FIG. 6 illustrates the location of poles and zeros in a system with two transmission antennas or channels. In this case, two filters (Filter 1 and Filter 2) are used. FIG. 7 illustrates the location of poles and zeros in a system with four transmit antennas or channels. In this case, four filters (Filter 1, Filter 2, Filter 3 and Filter 4) are used.

At the receiver side, a reception filter is implemented in such a way that, for a given transmit antenna, the overall transfer function of the channel will be $z^{-D}$, where D is the latency which arises due to the usage of a non-minimum phase system at the transmitter.

An alternative method of assignment of the transmission filters would be in such a way that one transmission antenna is not assigned any TT-Filter, while the remaining transmission antennas are assigned TT-Filters according to Eq. (1). In this case, N is the actual number of transmit antennas minus one.

Having tagged the signals such that they are associated with a particular transmission antenna, it is possible to implement a de-mixing adaptive algorithm using standard SISO equalization algorithms. As an example, the constant modulus algorithm and its derivative algorithms can now be used without requiring any further constraints. Here, a combined constant modulus algorithm (CMA) [17] and a modified constant modulus algorithm (MCMA) [18] are considered. The CMA has been incorporated for its fast convergence speed relative to the MCMA. It is also possible to use other algorithms such as Analytic Constant Modulus Algorithm (ACMA) [19] and the Finite Interval CMA [20]

The following symbols are defined:

$$u_k = H x_k + n_k \in C^{M \times l} \quad (2)$$

where k is the time index and $H \in C^{M \times N}$ is a matrix with the CSI. $x_k$ and $u_k$ are signal vectors as seen at the input and output, respectively, of a MIMO system. $n_k$ is an additive noise, which shall be assumed to be white Gaussian noise (AWGN).

$$u_l(k) = [u_{l,1}(k) u_{l,2}(k) \ldots u_{l,M}(k)]^T \quad (3)$$

Vector $u_l(k)$ is a vector obtained by filtering all the signals received by multiple receivers. The filters used in this case are filters whose transfer functions is the inverse of $H_1(z)$ The CMA based adaptive algorithm will be given by Eq. (4):

$$w_l(k+1) = w_l(k) - \mu_{l,1} u_l^*(k) \times (\{real(\hat{x}_l(k))^2 - 1\} real (\hat{x}_l(k)) + i \times \{imag(\hat{x}_l(k))^2 - 1\} imag (\hat{x}_l(k))) - \mu_{l,2} u_l^*(k) \times (|\hat{x}_l(k)|^2 - 2) \quad (4)$$

where $\mu_{l,1}$ and $\mu_{l,2}$ are the step sizes of adaptation, $$\hat{x}_l(k) = w_l^T(k) u_l(k) \quad (5)$$

and $$w_l(k) = [w_{l,1}(k) w_{l,2}(k) \ldots w_{l,M}(k)]^T \quad (6)$$

Just like in any other CMA, the above algorithm converges such that the output $\hat{x}_l(k)$ is a constant modulus signal.

Consider a case where each user "l" would like to transmit a constant modulus signal $\mu_l$. It is also possible to consider 16QAM (quadrature amplification modulation) or higher level modulation when the noise level is not very high.

For simplicity of the explanation, consider also a case where there is only direct propagation path by which the waves from different users reach the base station, such that each reception antenna of the base station receives a signal which is a weighted sum of the signals from all the active users. In such a case, if there are $N_u$ users, the filtered baseband signal from each user is $x_l$, where "l" is a subscript indicating a user index. The signal received by the first antenna will be given by Eq. (7):

$$y_1 = h_{11} * x_1 + h_{12} * x_2 + \ldots + h_{1N} * x_N \quad (7)$$

where $h_{11}, \ldots, h_{1N}$ are gains between users $1, \ldots, N$ and the reception antenna 1, respectively.

Similarly, the signal received by the second antenna will be given by Eq. (8):

$$y_2 = h_{21} * x_1 + h_{22} * x_2 + \ldots + h_{2N} * x_N \quad (8)$$

where $h_{21}, \ldots, h_{2N}$ are gains between users $1, \ldots, N$ and the reception antenna 2, respectively. In general, the baseband signal received by antenna "m" will be given by Eq. (9):

$$y_m = h_{m1} * x_1 + h_{m2} * x_2 + \ldots + h_{mN} * x_N \quad (9)$$

where $h_{m1}, \ldots, h_{mN}$ are gains between users $1, \ldots, N$ and the reception antenna m, respectively. According to the present embodiment, each user's signal $u_l$ is filtered by a unique filter $H_l(z)$ resulting in a signal xi which is not a constant modulus signal. At the receiver, signals $y_1 \ldots y_M$ are filtered by an inverse filter associated with the source of interest Thus if the source of interest is $u_1$, then $y_1, \ldots, y_M$ will each be filtered by $1/H_1(z)$ resulting in $z_{11}, \ldots, z_{1M}$. By inserting the inverse filter $1/H_1(z)$, only the signal $x_1$ will be inversely converted to a constant modulus signal $u_1$, while all the other signals $x_2, \ldots, x_N$ will remain as non-constant modulus signals.

Next, the resulting signals $z_{11}, \ldots, z_{1M}$ are weighted by adaptive coefficients $w_{11}, \ldots, w_{1M}$ and summed to generate signal $v_1$. The addition with such weighting is performed in order to remove other sources or interfering signals which occupy the same frequency band or transmission time interval. As the result of this weighting, each gain is adjusted under constraint that a sum of weighted multiplexed filtering output signals has the same property as the original signal of the corresponding source.

Applying the constant modulus algorithm will ensure that error $(|v_1|^2 - 1)$ is minimized. Minimization of this error occurs when $|v_1|$ is 1, which implies that all the non-constant modulus signals, $x_2, \ldots, x_N$ have been nulled by zeros (nulls) of an array antenna.

In the above explanation, considered is a case where only the direct propagation path exists between each mobile unit and the base station, resulting in an instantaneous mixture problem. In practice, this may not be the case especially when there exists propagation in multiple paths (multi-path propagation). In such a situation, the each signal from a user is converted from serial to parallel. Next, each signal within the parallel line is, filtered using a filter that is unique to each mobile terminal. The filtered parallel signals are then filtered using a filter bank such as IFFT to generate parallel signals which are then converted to serial. The resulting serial signal is up-sampled and processed further using space time coding, if necessary, and the serial signal is then filtered using a band limiting filter and modulated, before transmission.

At the receiver, the reverse signal processing operation is done, and the received signal is converted to parallel, before applying FFT. As in the case of the time domain, each bin in the frequency domain is now an instantaneous mixing problem. Hence, only the signal of interest will be generated by filtering each bin using the inverse filter of the tagging filter associated with the desired user, and applying de-mixing algorithm to all the bins.

In summary, the tagging filter at the transmitter acts as a key locked to the property of the signal to be transmitted. At the receiver, the inverse tagging filter restores only the property of the signal of interest. The constant modulus, orthogonality or even cyclo-stationarity can be used as the signal property. Only the signal of interest is then retrieved.

Next, the specific use to which the present invention is applied will be explained. FIG. 7 shows one example of application where the present invention can be applied. In the figure, T-1, T-2 and T-3 represent mobile terminals with single or multiple of antenna. R-1, R-2 and R-3 represent the antennas of base station BT. The base terminal has multiple reception antennas which are used to separate signals from mobile terminals T-1, T-2 and T-3. For explanation purposes, the number of antennas is limited to three here However, in a general case, there could be N pieces of mobile terminals of T-1, T-2, . . . , T-N, and R pieces of reception antennas of R-1, R-2, . . . , R-M, where M≧N.

Figure 9:
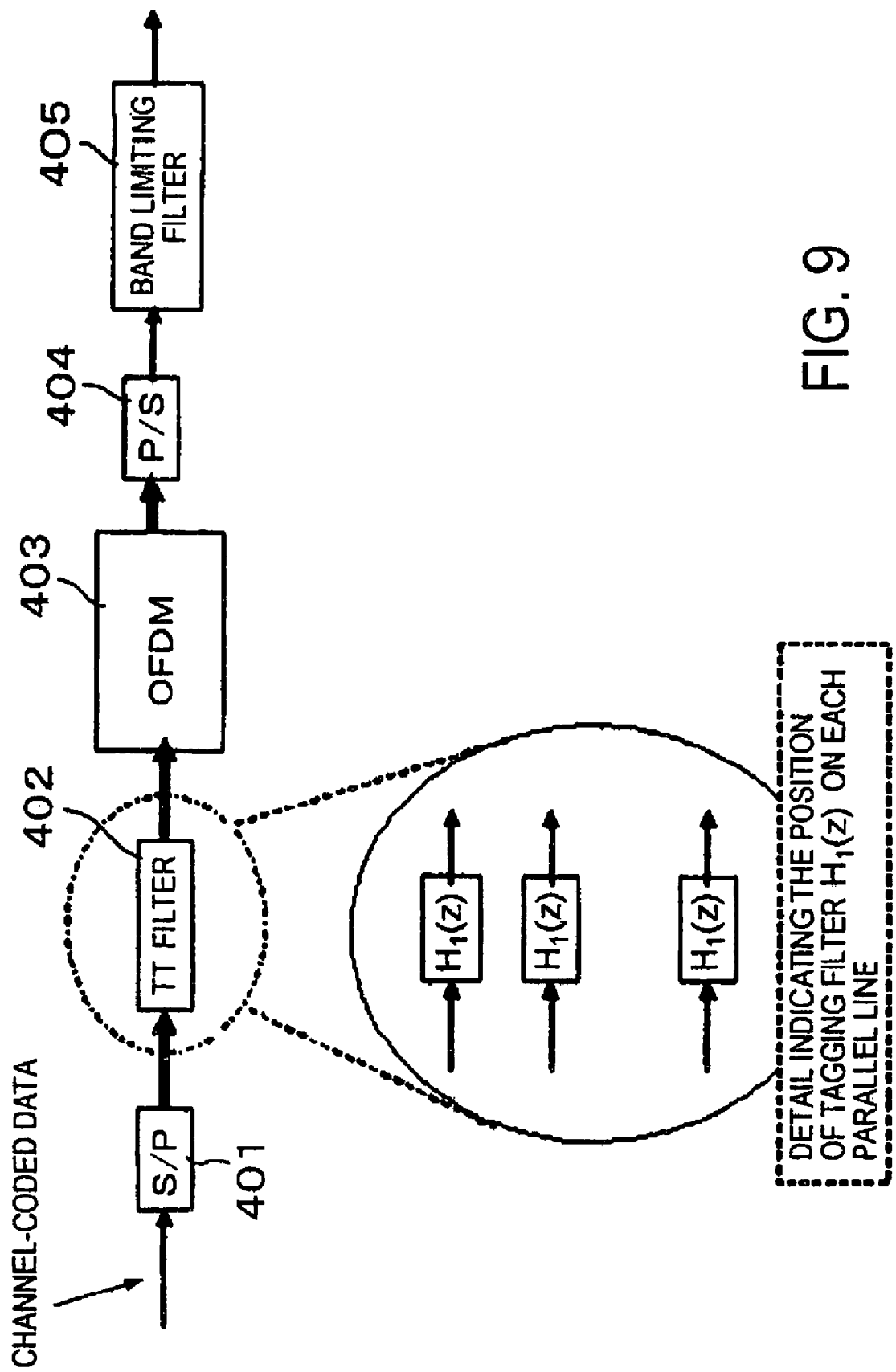
FIG. 9 is a view of a baseband model of a mobile terminal shown in FIG. 8, illustrating in detail the position of inserting the tagging filters.

Each mobile terminal is assigned a tagging filter that is unique to that terminal. Furthermore, in a multi-path environment, after having filtered the signals using the tagging filter, the filtered signals are modulated using OFDM as illustrated in FIG. 9 for the case of mobile terminal T-1. FIG. 9 illustrates an example of constitution of the mobile terminal. This mobile terminal is provided with: serial-to-parallel (S/P) converter 401 converting the channel-coded serial data to parallel data; tagging (TT) filter 402 filtering the parallel data after the conversion; OFDM modulator 403 arranged at the output side of tagging filter 402; parallel-to-serial (P/S) converter 404 converting the output of the OFDM modulator into serial data; and band limiting filter 405 limiting band of the serial data after the conversion. Tagging filter 402 is provided on each line of the parallel data outputted from serial-to-parallel converter 401.

At the receiver, that is, base terminal BT, the signals received from multiple antennas are firstly preprocessed by band pass filtering, amplification, and down-conversion to the base band. Also, within the pre-processing unit (not shown), OFDM frame synchronization and removal of the cyclic prefix is done. Next, as illustrated in FIG. 4B described above, the base band signal from each antenna or receiver is converted from serial to parallel by OFDM demodulator 307, and all the signals generated in parallel are filtered by inverse filter 312 associated with a user or terminal of interest. Assuming that a filter corresponding to terminal T-1 is filter $H_1$, when the signals from terminal T-1 are to be retrieved, all the signals from the antenna after the serial-to-parallel conversion will be filtered by a filter which models the inverse of filter $H_1$.

In each terminal, a unique filter is used to filter data which has been converted into parallel. Thus, if the baseband signal associated with terminal T-1 is $u_1$, the corresponding signals after the serial-to-parallel conversion will be $U_{1,1}, U_{1,2}, \ldots, U_{1,NF}$. These signals will then be modulated using OFDM and processed further by including cyclic prefix, pulse shaping, and up-conversion.

The signal in the first frequency bin of the first antenna after FFT will be given by Eq. (10):

$$Y_{1,1} = H_{11,1}*X_{1,1} + H_{12,1}*X_{2,1} + \ldots + H_{1N,1}*X_{N,1} \quad (10)$$

where $H_{11,1}, \ldots, H_{1N,1}$ are the gains, in the first frequency bin, between users $1, \ldots N$ and the reception antenna 1, respectively. Similarly, the signal associated with the second frequency bin received by the first antenna is given by Eq. (11):

$$Y_{1,2} = H_{11,2}*X_{1,2} + H_{12,2}*X_{2,2} + \ldots + H_{1N,2}*X_{N,2} \quad (11)$$

where $H_{11,2}, \ldots, H_{1N,2}$ are the gains, in the second frequency bin, between users $1 \ldots N$ and the reception antenna 1, respectively.

Along the same line, the signal in the first frequency bin, which has been received by the second antenna, will be given by Eq. (12):

$$Y_{2,1} = H_{21,1}*X_{1,1} + H_{22,1}*X_{2,1} + \ldots + H_{2N,1}*X_{N,1} \quad (12)$$

where $H_{21,1}, \ldots, H_{2N,1}$ are gains, in the first frequency bin, between users $1, \ldots, N$ and the reception antenna 2, respectively. In general, the baseband signal, which is received by the antenna of number m and the frequency bin of number b, will be given by Eq. (13):

$$Y_{m,b} = H_{m1,b}*X_{1,b} + H_{m2,b}*X_{2,b} + \ldots + H_{mN,b}*X_{N,b}. \quad (13)$$

Next, all the frequency bins are filtered using the inverse of a filter associated with the terminal of interest. Assuming that the size of FFT is $N_F$, in order to retrieve the signals of terminal T-1, all the frequency bins $\{Y_{m,b}: m=1, \ldots M$ (number of reception antennas) and $b=1, \ldots, N_F\}$ will be filtered by an inverse of filter $H_1$, resulting in $Z_{m1,b}$, where $m=1, \ldots, M$ and $b=1, \ldots N_F$. For a 64-point FFT, $N_F$ will be 64.

Next, signals within a frequency bin are grouped together, to create $N_F$ pieces of vectors each of size M. As an example, the $b^{th}$ vector which is associated with the $b^{th}$ frequency bin is given by $\{Z_{11,b}, Z_{21,b}, \ldots Z_{M1,b}\}$. The respective elements of this vector are then multiplied by adaptive weighting factors $\{w_{11,b}, w_{21,b}, \ldots w_{M1,b}\}$ resulting in signal $V_{1,b}$ which is a mixture of constant modulus signal associated with user "1" and the non-constant modulus signals associated with all the other users or terminals.

Finally, by applying any adaptive algorithm that minimizes the modulus error $\{|V_{1,b}|^2 - 1\}^2$ will ensure that all the interfering signals will be cancelled. The above process can then be repeated for the second frequency bin, the third frequency bin up to the $N_F^{th}$ frequency bin. The signals of other users can also be generated in the same way.

Figure 10:
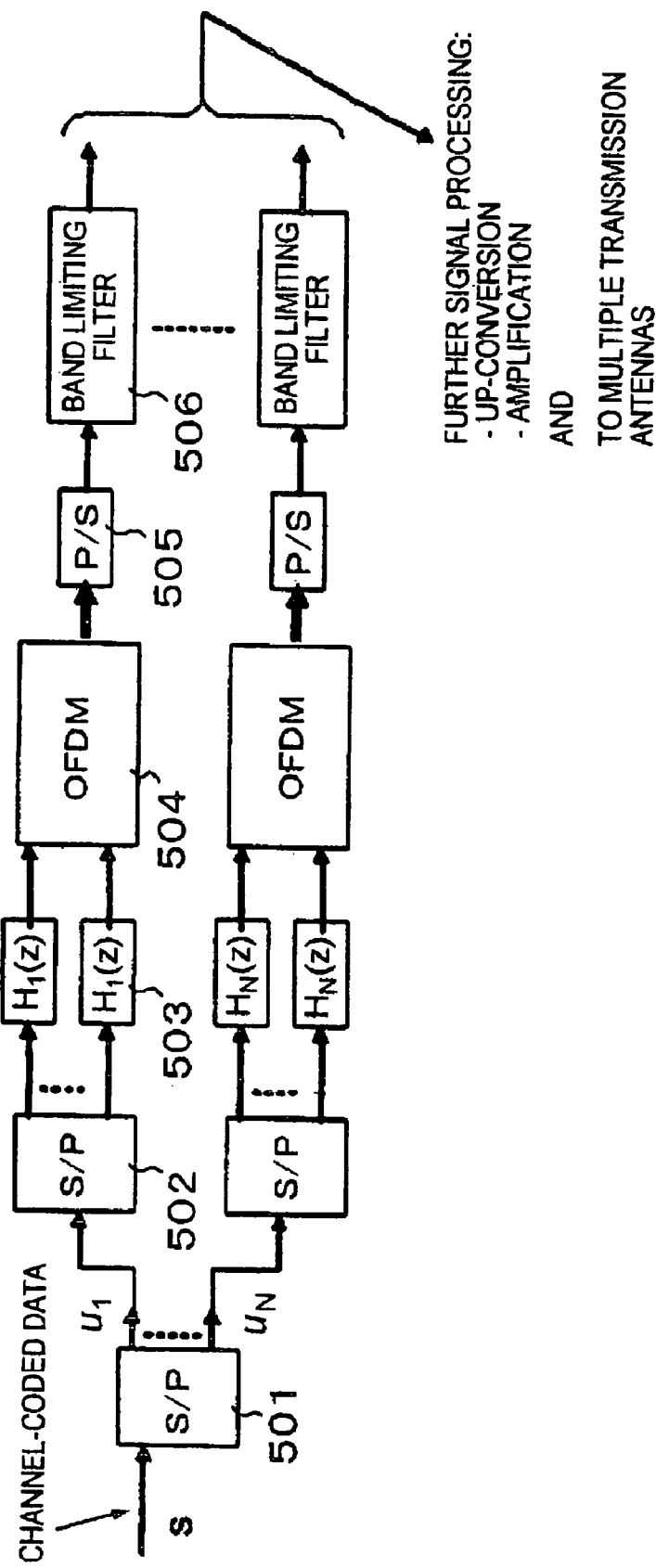
FIG. 10 is a block diagram of a baseband model of a transmitter with N-space based channels, which carries signals that are filtered using the tagging filters and transmitted using the same frequency band, time slot or code.

In another embodiment of the present invention, both the transmitter and receiver have multiple number of antennas with the ultimate aim of increasing the rate of data transmission. The data to be transmitted "s" is first converted into parallel data "$\{u_1, \ldots, u_N\}$" to be transmitted through the multiple antennas. Once this has been done, the parallel data can be considered as data originating from multiple independent terminals as described above. These signals will then be modulated using OFDM and processed further by including cyclic prefix, pulse shaping, and up-conversion. FIG. 10 illustrates the baseband model of such a system. In this model, a general serial-to-parallel (S/P) conversion is considered. It is therefore possible to implement this S/P using space time coding (STC) techniques or simple data buffering.

As illustrated in FIG. 10, this system is provided with serial-to-parallel converter 501 converting channel-encoded data s to be transmitted into parallel data $\{u_1, \ldots, u_N\}$. For each of elements $u_1, \ldots, u_N$ of the parallel data, the system is further provided with: serial-to-parallel (S/P) converter 502 regarding the element as serial data to further convert it to parallel data; tagging (TT) filters 503 filtering the parallel data after the conversion; OFDM modulator 504 arranged at the output side of tagging filters 503; parallel-to-serial (P/S) converter 505 converting the output of the OFDM modulator into serial data; and band limiting filter 506 limiting band of the serial data after the conversion. Tagging filter 503 is placed on each line of the parallel data outputted from serial-to-parallel converter 502. Here, the transfer function of the tagging filter corresponding to element $u_1$ of the parallel data is $H_1(z)$, and the transfer function of the tagging filter corresponding to element $u_N$ of the parallel data is $H_N(z)$. The output from each band limiting filter 506 is passed to the relevant transmission antenna through further signal processing such as up-conversion and amplification.

At the receiver, signals received from multiple antennas are firstly pre-processed by band pass filtering, amplification, and down-conversion to the base band. Also, within the pre-processing unit (not shown), OFDM frame synchronization and removal of the cyclic prefix is done. Next, as illustrated in FIG. 4B, the base band signal from each antenna or receiver is converted from serial to parallel by OFDM demodulator 307, and all the signals generated in parallel are filtered by inverse filter 312 associated with a user or terminal of interest. Assuming that a filter corresponding to terminal T-1 is filter $H_1$, when the signals from the first transmitter are to be retrieved, all the signals from all the antennas after the serial-to-parallel conversion will be filtered by a filter which models the inverse of filter $H_1$.

Next, all the frequency bins $\{Y_{m,b}: m=1, \ldots, M$ (number of receive antennas), and $b=1, \ldots, N_F$ (size of FFT)$\}$ will be filtered by an inverse filter of filter $H_1$, resulting in $Z_{m1,b}$ where $m=1, \ldots, M$, and $b=1, \ldots, N_F$. For a 64-point FFT, $N_F$ will be 64. This is followed by grouping the frequency bins together. As an example, the $b^{th}$ vector which is associated with the $b^{th}$ frequency bin is given by $\{Z_{11,b}, Z_{21,b}, \ldots, Z_{M1,b}\}$. The respective elements of this vector are then multiplied by adaptive weighting factors $\{W_{11,b}, W_{21,b}, \ldots, W_{M1,b}\}$ resulting in signal $V_{1,b}$ which is a mixture of constant modulus signal associated with user "1" and the non-constant modulus signals associated with all the other users or terminals.

Then, any adaptive algorithm minimizing the modulus error $\{|V_{1,b}|^2-1\}^2$ is applied. The above process can then be repeated for the second frequency bin, the third frequency bin up to the $N_F^{th}$ frequency bin. The signals of other transmission antenna can also be generated in the same way. The resulting signals $\{V_{1,1}, \ldots V_{1,NF}\}$ are converted to serial data $v_1$. The same processing is applied to $\{V_{2,1} \ldots V_{2,NF}\}$, which results in $v_2$. In general, $\{V_{m,1} \ldots V_{m,NF}\}$ will result in $v_m$. Finally, signals $\{v_1 v_2 \ldots v_N\}$ are converted into serial data s'.

Figure 8:
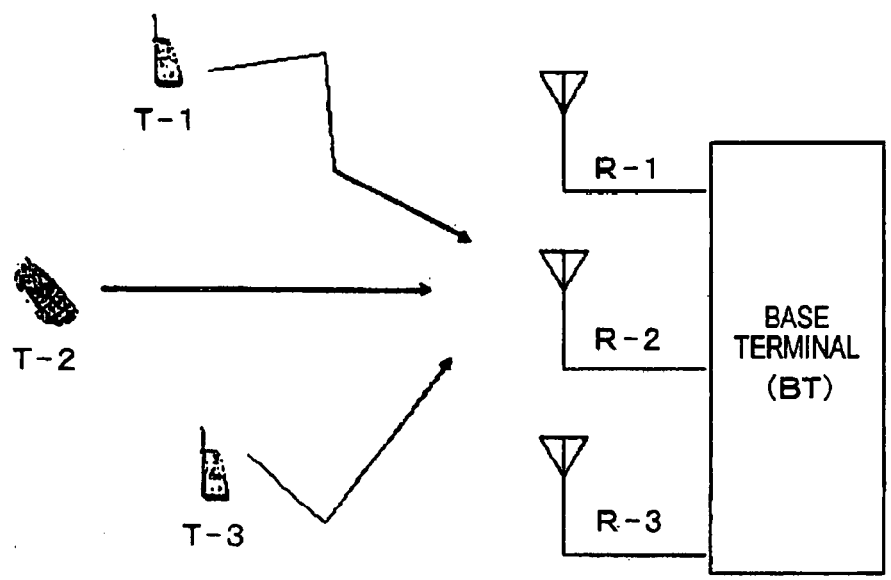
FIG. 8 is a view illustrating mobile terminals T-1, T-2 and T-3 which is linked to common base terminal BT with three receiver antennas R-1, R-2 and R-3.

The principle of operation of the model in FIG. 10 is basically the same as that in FIGS. 8 and 9.

Thus as explained in model shown in FIG. 9, it is possible to separate all the mixed frequency bins. During each separation, it is possible to retrieve the signals associated with the transmission antenna of interest. Finally, the resulting signal will be void of any permutation and can easily be converted from parallel data to serial data.

This effect is achieved by using a filter that is unique to a given transmission antenna. At the receiver, since an inverse filter corresponding to the transmission antenna of interest is used, only the property of the signal of interest is restored. Then, using a blind adaptive algorithm that responds or is constrained to the property of the signal of interest, it is possible to retrieve the signals in the order of their interest, without any of permutation.

INDUSTRIAL APPLICABILITY

The technology of the present invention can be applied to the field of mobile wireless communication where a number of users share the same channel, which might be frequency, time or code. This is especially so in the wireless LAN (local area network) where interference from other LAN can be minimized or eliminated without using any training signal. Furthermore, the use of the tagging filter brings with it extra security since the signal is modulated before transmission.

Another area to which the present invention can be applied is in the recording over a magnetic recording medium or an optical recording medium with multiple sensors or heads. In such an application, it is possible to blindly retrieve data of all the parallel tracks without any permutation.

It is also possible to apply the present invention to single input single output (SISO) systems. Such a system could be a simple QPSK based transmitter and a receiver with a blind adaptive equalizer. In this kind of application, the real and imaginary channels can be considered as channels which results in a 2-port transmitter and a 2-port receiver. Applying the idea presented in this invention will always result in the real component signal being retrieved on the real channel while the imaginary component signal will always be received on the imaginary channel.

The invention claimed is:

1. A method of transmitting, from a transmitter side, a signal from multiple sources on a multiple input multiple output (MIMO) channel by using spectrum or time or spreading code which is common to said multiple sources, the method comprising:
    performing process of filtering and tagging a signal from a source of at least one of the multiple sources with a filter having property uniquely defined for each of said at least one source; and
    transmitting said filtered and tagged signal of at least one source together with signals of other sources that constitute the multiple sources.

2. The method according to claim 1, wherein each of said filters is a linear filter which is unique for each of said sources which are to be transmitted simultaneously through said MIMO channel, using multiple transmitters.

3. The method according to claim 2, wherein said linear filter is an allpass filter having flat frequency response, such that all the sources are transmitted simultaneously through said MIMO channel, using multiple transmitters.

4. A method of blindly separating, from a received signal represented as a multiple output system, a transmitted signal from each source,
    wherein, for at least one source, a filter uniquely defined for a source is determined for each source,
    the method comprising the steps of:
    applying an inverse filter corresponding to inverse of said filter to one or more of multiple outputs of said received signal so as to restore property of the corresponding source; and
    adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code.

5. A method of blindly separating signals from each source, the method comprising the steps of:
    receiving a signal transmitted from a transmitter side by a method of transmitting a signal from multiple sources on a MIMO channel by using spectrum or time or spreading code which is common to said multiple sources, the method comprising performing process of filtering and tagging a signal from a source of at least one of the multiple sources with a filter having property uniquely defined for each of said at least one source, and transmitting said filtered and tagged signal of at least one source together with signals of other sources that constitute the multiple sources;
    representing the received signal as a multiple output system;
    applying an inverse filter corresponding to inverse of said filter, which has been applied when transmitting the signal, to one or more of multiple outputs of said received signal so as to restore property of a corresponding source; and
    adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code.

6. The method according to claim 5, wherein each of said filters is a linear filter which is unique for each of said sources which are to be transmitted simultaneously through said MIMO channel, using multiple transmitters.

7. The method according to claim 6, wherein said linear filter is an allpass filter having flat frequency response, such that all the sources are transmitted simultaneously through said MIMO channel, using multiple transmitters.

8. A transmission device for transmitting a signal from multiple sources on a MIMO channel by using spectrum or time or spreading code which is common to said multiple sources, comprising:
a filter for filtering and tagging a signal from a source of at least one of the multiple sources, said filter having a property uniquely defined for each of said at least one source; and
means for transmitting said filtered and tagged signal of at least one source together with signals of other sources that constitute the multiple sources.

9. The transmission device according to claim 8, wherein each of said filters is a linear filter which is unique for each of said sources which are to be transmitted simultaneously through said MIMO channel, using multiple transmitters.

10. The transmission device according to claim 9, wherein said linear filter is an allpass filter having flat frequency response, such that all the sources are transmitted simultaneously through the MIMO channel, using multiple transmitters.

11. A system for blindly separating, from a received signal represented as a multiple output system, a transmitted signal of each source,
wherein, for at least one source, a filter uniquely defined for a source is determined for each source,
the system comprising:
an inverse filter corresponding to inverse of said filter, said inverse filter being applied to one or more of multiple outputs of said received signal to restore property of the corresponding source; and
adjustment means for adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code.

12. A reception device which receives a signal transmitted from a transmission device for transmitting a signal from multiple sources on a MIMO channel by using spectrum or time or spreading code which is common to said multiple sources and restores a signal of each source, said transmission device comprising: a filter for filtering and tagging a signal from a source of at least one of the multiple sources; and means for transmitting said filtered and tagged signal of at least one source together with signals of other sources that constitute the multiple sources, said filter having a property uniquely defined for each of said at least one source, said reception device comprising:
an inverse filter corresponding to inverse of said filter which has been applied when transmitting the signal, said inverse filter being applied to one or more of multiple outputs of a received signal which is represented as a multiple output system to restore property of the corresponding source; and
adjustment means for adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code.

13. The reception device according to claim 12, wherein each of said filters is a linear filter which is unique for each of said sources which are to be transmitted simultaneously through said MIMO channel, using multiple transmitters.

14. The reception device according to claim 13, wherein each of said filters is a linear filter which is unique for each of said sources which are to be transmitted simultaneously through said MIMO channel, using multiple transmitters.

15. A communication system comprising:
a transmission device for transmitting a signal from multiple sources on a MIMO channel by using spectrum or time or spreading code which is common to said multiple sources, said transmission device comprising: a filter for filtering and tagging a signal from a source of at least one of the multiple sources; and means for transmitting said filtered and tagged signal of at least one source together with signals of other sources that constitute the multiple sources, said filter having a property uniquely defined for each of said at least one source;
a reception device which receives a signal transmitted from said transmission device, said reception device comprising: an inverse filter corresponding to inverse of said filter which has been applied when transmitting the signal, said inverse filter being applied to one or more of multiple outputs of a received signal which is represented as a multiple output system to restore property of the corresponding source; and adjustment means for adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code; and
a link based on radio wave, sound wave or light, said link connecting said transmission device and said reception device.

16. The communication system according to claim 15, wherein each of said filters is a linear filter which is unique for each of said sources which are to be transmitted simultaneously through said MIMO channel, using multiple transmitters.

17. The communication system comprising: a transmission device according to claim 16 wherein said linear filter is an allpass filter having flat frequency response, such that all the sources are transmitted simultaneously through the MIMO channel, using multiple transmitters.

18. A method of transmitting, from a transmitter side, a signal from multiple sources on a MIMO channel by using spectrum or time or spreading code which is common to said multiple sources, the method comprising:
performing process of filtering and tagging a signal from a source of at least one of the multiple sources with a filter which has property uniquely defined for each of said at least one source and operates at the same rate as a sampling rate just after modulation of the source; and
transmitting said filtered and tagged signal of at least one source together with signals of other sources that constitute the multiple sources.

19. A method of blindly separating signals from each source, the method comprising the steps of:

receiving a signal transmitted from a transmitter side by a method of transmitting a signal from multiple sources on a MIMO channel by using spectrum or time or spreading code which is common to said multiple sources, the method comprising performing process of filtering and tagging a signal from a source of at least one of the multiple sources with a filter which has property uniquely defined for each of said at least one source and operates at the same rate as a sampling rate just after modulation of the source, and transmitting said filtered and tagged signal of at least one source together with signals of other sources that constitute the multiple sources;

representing the received signal as a multiple output system;

applying an inverse filter corresponding to inverse of said filter, which has been applied when transmitting the signal, to one or more of multiple outputs of said received signal so as to restore property of a corresponding source; and adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code.

20. A transmission device for transmitting a signal from multiple sources on a MIMO channel by using spectrum or time or spreading code which is common to said multiple sources, comprising:

a filter for filtering and tagging a signal from a source of at least one of the multiple sources, wherein said filter has a property uniquely defined for each of said at least one source and operates at the same rate as a sampling rate just after modulation of the source; and means for transmitting said filtered and tagged signal of at least one source together with signals of other sources that constitute the multiple sources.

21. A reception device which receives a signal transmitted from a transmission device for transmitting a signal from multiple sources on a MIMO channel by using spectrum or time or spreading code which is common to said multiple sources, said transmission device comprising: a filter for filtering and tagging a signal from a source of at least one of the multiple sources; and means for transmitting said filtered and tagged signal of at least one source together with signals of other sources that constitute the multiple sources, wherein said filter has a property uniquely defined for each of said at least one source and operates at the same rate as a sampling rate just after modulation of the source, and restores a signal of each source, said reception device comprising:

an inverse filter corresponding to inverse of said filter which has been applied when transmitting the signal, said inverse filter being applied to one or more of multiple outputs of a received signal which is represented as a multiple output system, said inverse filter restoring property of the corresponding source; and adjustment means for adjusting gain of each of signals which have been filtered by said inverse filter, under constraint that a sum of weighted multiplexed filtering output signals has the same property as an original signal of the corresponding source, in order to remove other sources or interfering signals which occupy the same frequency band or transmission time interval or spreading code.

* * * * *